United States Patent [19]
Murphy, Jr. et al.

[11] 3,950,998
[45] Apr. 20, 1976

[54] PRESSURE GAGE AND VENTING MEANS FOR USE WITH MACHINERY

[75] Inventors: Frank W. Murphy, Jr.; J. David Nunneley, both of Tulsa, Okla.

[73] Assignee: Frank W. Murphy Manufacturer, Inc., Tulsa, Okla.

[22] Filed: Sept. 17, 1975

[21] Appl. No.: 613,976

[52] U.S. Cl. .................................. 73/411; 73/389
[51] Int. Cl.² ........................................... G01L 7/04
[58] Field of Search ........................... 73/411–418, 73/389; 251/43, 44, 63; 137/115; 200/81.8

[56] References Cited
UNITED STATES PATENTS

| | | | |
|---|---|---|---|
| 3,473,563 | 10/1969 | Tatum | 73/411 |
| 3,678,758 | 7/1972 | Lawrence | 73/411 |

*Primary Examiner*—Donald O. Woodiel
*Attorney, Agent, or Firm*—D. Paul Weaver

[57] ABSTRACT

A Bourdon tube pressure gage is employed to monitor operating pressures of machines, such as engines or compressors. The gage has a manually adjustable high pressure limit stop which arrests movement of the gage pressure indicating pointer. A carrier link for a bleeder valve has a lost motion connection with drive mechanism for said pointer, and the carrier link is attached to the movable extremity of the Bourdon tube to be bodily shifted thereby with said vent valve. An abutment on said pointer drive mechanism is in the path of movement of an actuator stem of the vent valve. The pressure chamber of the vent valve is in pressure communication with the low pressure chamber of a booster valve on the back of the pressure gage, said booster valve having low and high pressure input ports and a vent port.

8 Claims, 6 Drawing Figures

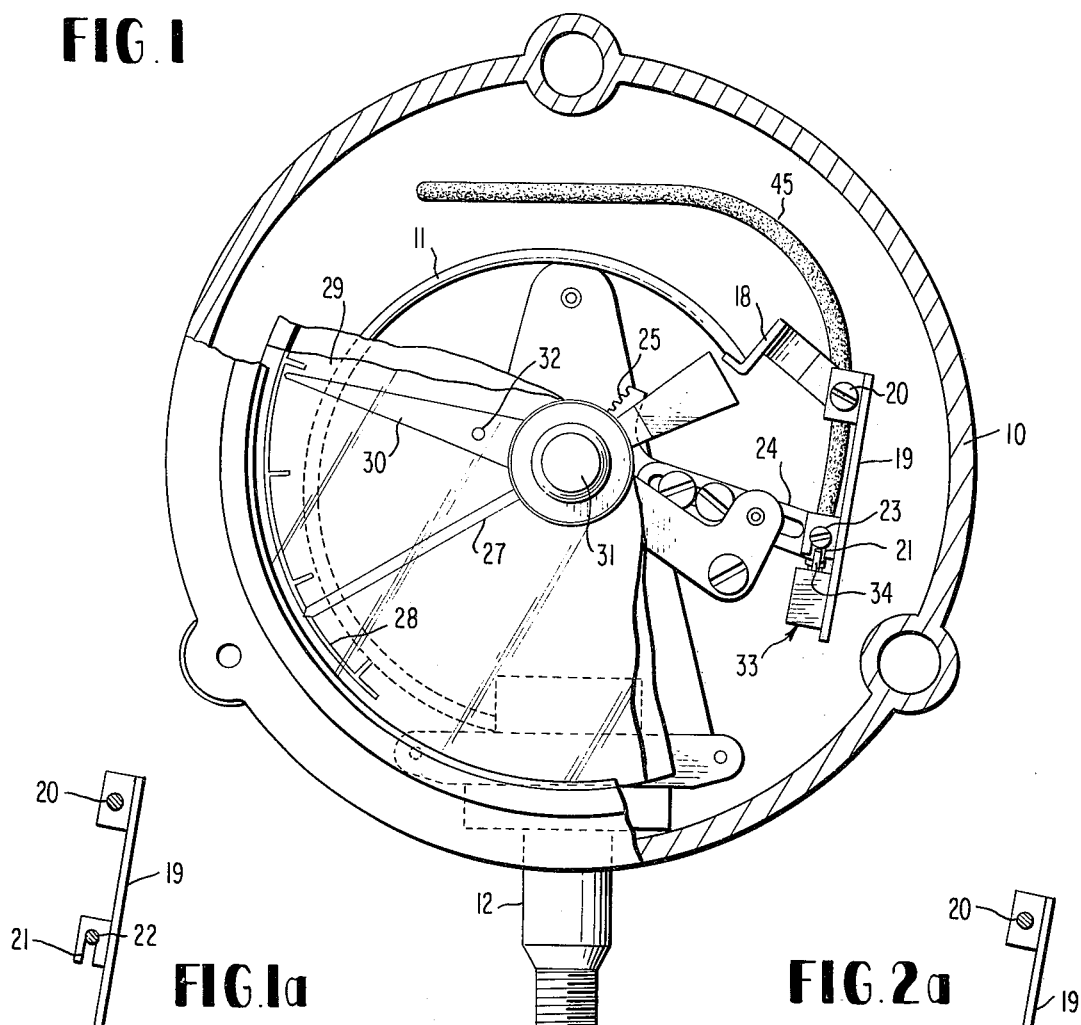
FIG.1
FIG.1a
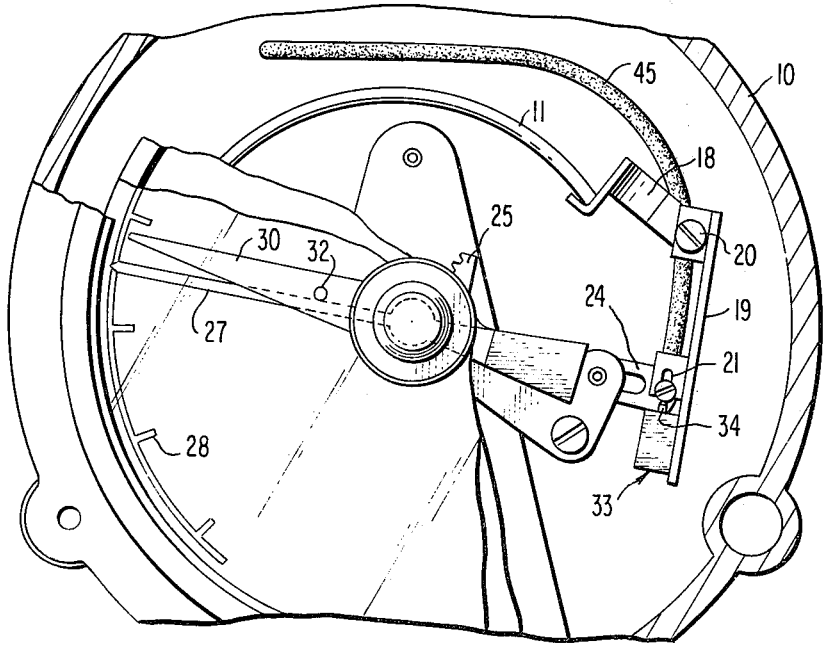
FIG.2
FIG.2a

PRESSURE GAGE AND VENTING MEANS FOR USE WITH MACHINERY

BACKGROUND OF THE INVENTION

The invention relates to pressure indicating and monitoring gages of the type disclosed in U.S. Pat. No. 3,678,758, and the objective of the invention is to improve on and enlarge the monitoring capabilities of gages of that class.

More particularly, the invention embodies a Bourdon tube pressure gage with rotary sweep indicator pointer and a mechanical drive mechanism for the pointer as disclosed in the above-mentioned prior patent. A manually adjustable high pressure limit stop for the pointer is provided on the gage in accordance with the teachings of the prior art, and the Bourdon tube of the gage has a connection with external pressure to be monitored, such as the operating pressure of a pump, compressor or engine. A booster valve attached to the casing of the pressure gage receives full system control pressure through a high pressure input port. A low pressure input port of the booster valve receives reduced pressure through a regulator intervened between the booster valve and system supply. The booster valve has a full system pressure vent port normally closed by a differential area piston whose larger side is in communication with the low pressure chamber of the booster valve.

The low pressure chamber of the booster valve communicates through tubing inside of the pressure gage with a bleeder valve mounted on a carrier link attached to the movable extremity of the Bourdon tube and traveling therewith. The carrier link has the bleeder valve bodily mounted thereon to move therewith and the link has a lost motion connection with a pivoted arm forming a part of the sweep pointer drive mechanism of the gage. An actuator pin of the bleeder valve moves into contact with an abutment element on said pivoted arm to cause opening and venting of the bleeder valve chamber, thereby further reducing the pressure in the low pressure chamber of the booster valve and enabling the booster valve to vent full system pressure to atmosphere. This venting can effect the shutting down of a pump, compressor or engine quickly and automatically when such machine develops a dangerously high pressure.

In the above manner, the invention performs the functions of at least two separate devices commonly employed in the prior art and achieves the same results by a single integrated and simplified means. In the prior art, usually a panel mounted pressure or temperature indicating gage is employed in conjunction with a separate pressure or temperature sensing device equipped with a factory set trip point. By eliminating one of the two prior art devices, considerable economies are effected along with increased efficiency and convenience. It should be understood that the invention is applicable to either pressure or temperature monitoring Bourdon tube gages.

The beneficial features and advantages of the invention will become apparent to those skilled in the art during the course of the following description.

BRIEF DESCRIPTION OF DRAWING FIGURES

FIG. 1 is a front elevational view, partly broken away and partly in section, of a Bourdon tube pressure indicating gage equipped with the invention, the gage in FIG. 1 indicating a relatively low safe operating pressure and the bleeder valve being in the normally closed position.

FIG. 1a is a fragmentary elevational view of a bleeder valve carrier link and lost motion connection corresponding to the condition of the pressure gage in FIG. 1.

FIG. 2 is a view of the gage similar to FIG. 1 but with the gage indicating an excessively high pressure for a machine being monitored and with the gage pointer in contact with the adjustable high pressure limit stop and the bleeder valve open.

FIG. 2a is a view of the bleeder valve carrier link and lost motion connection corresponding to the gage condition shown in FIG. 2.

DETAILED DESCRIPTION

Figure 3:
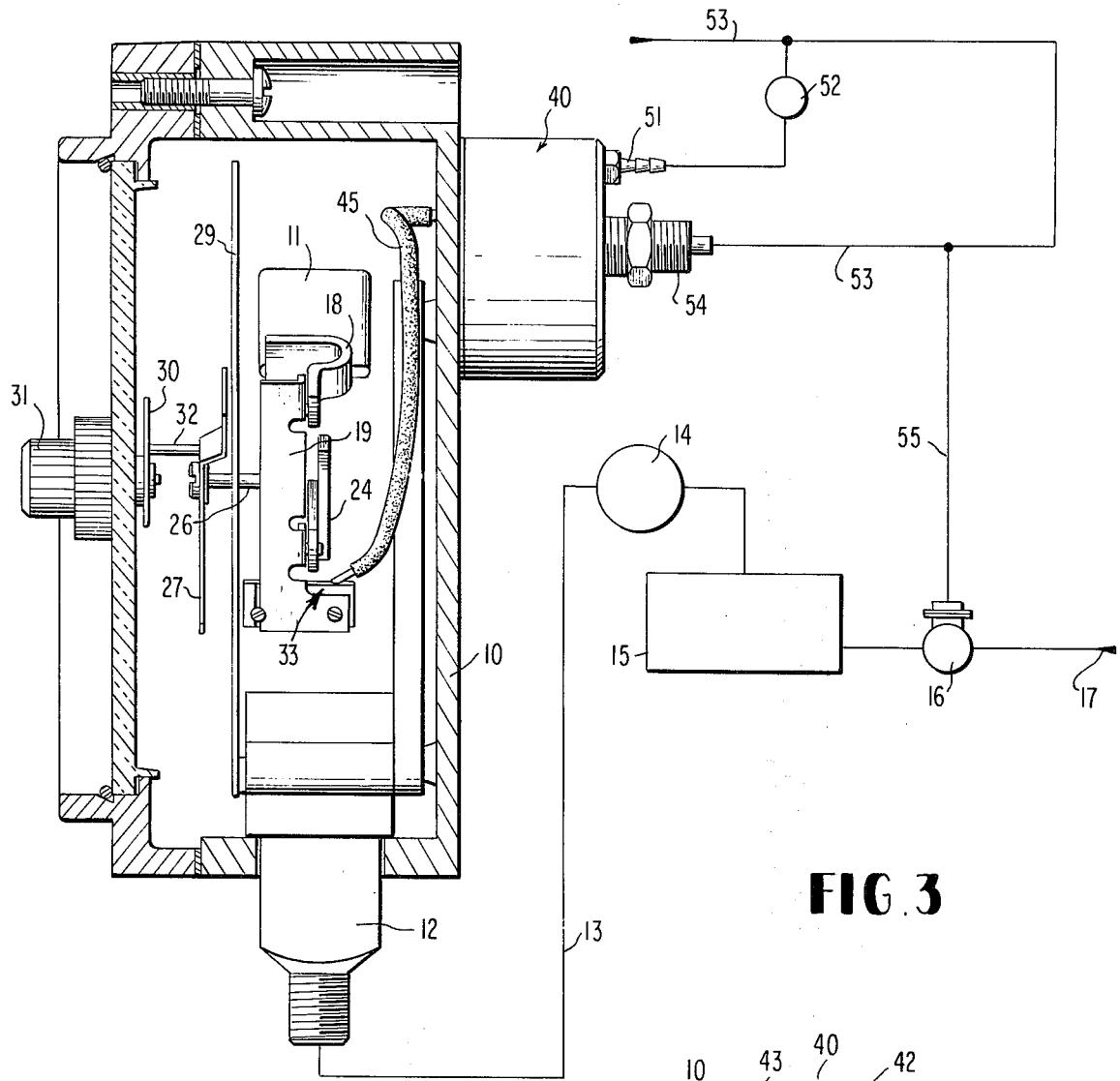
FIG. 3 is a central vertical sectional view through the pressure gage, parts in elevation, and illustrating the attached booster valve and associated system components, the latter being schematically shown.

Referring to the drawings in detail wherein like numerals designate like parts, the numeral 10 designates the casing of a pressure gage having a Bourdon tube 11, one end of which is fixed to a pressure inlet fitting 12 adapted for connection with a pressure transmitting line 13 leading to a pressure chamber 14 receiving pressure to be monitored from a machine 15, such as an engine or the like. The engine 15 receives gas through a diaphragm fuel valve 16 from a suitable source 17.

The opposite free movable end of Bourdon tube 11 has a bracket element 18 fixed thereon having a carrier link 19 secured thereto at 20 by a screw or the like. The carrier link 19 has a slotted lost motion connection at 21 with the screw shank 22 of an abutment element or screw 23 carried by a pivoted arm 24. The pivoted arm 24 has a sector gear 25 attached to it for driving another gear, not shown, carried by the rotary shaft 26 of a gage sweep pointer 27 which cooperates with the graduated scale 28 on a stationary dial 29 of the pressure gage. The graduations of scale 28 are pressure indications in pounds per square inch or the like. The Bourdon type gage may also be graduated to indicate temperatures. The drive mechanism for the gage pointer 27 of which the arm 24 is a part may be exactly as disclosed in the mentioned prior U.S. Pat. No. 3,678,758 and further details of the mechanism will not be described herein.

Also, as disclosed in said prior patent, a manually adjustable high pressure limit stop pointer 30 is provided on the instrument having a turning knob 31. The pointer 30 has a projecting stop pin 32 in the path of movement of the instrument pointer 27. Therefore, with the pointer 30 manually set to a particular high pressure limit on the scale 28, the stop pin 32 will arrest the movement of pointer 27 at that high pressure limit point and the pointer may travel no further in the high pressure direction.

However, when the monitored pressure of machine 15 sensed through fitting 12 exceeds the preset limit established by the pointer 30, the Bourdon tube 11 continues to expand pulling the carrier link 19 with it and causing the relative movement between the link 19 and screw shank 22 shown in FIG. 2a. As will be described, this relative movement is utilized to operate a bleeder valve 33 bodily mounted on the lower end portion of carrier link 19.

The bleeder valve 33 has a projecting actuator pin 34 held normally extended by an expansion spring 35 in a chamber 36 of the bleeder valve. A shoulder or collar 37 on the actuator pin in the chamber 36 engages and urges an annular compressible seal 38 into valve closing engagement with a tapered seat 39 formed on the bleeder valve casing. When the actuator pin 34 following the described relative movement of the link 19 and arm 24 due to the slotted lost motion connection 21 engages abutment element 23, the spring 35 will yield causing separation of the seal 38 from seat 39 and venting of pressure in chamber 36 as depicted by arrows in FIG. 4.

Preferably on the back of gage casing 10, a booster valve casing 40 is fixedly mounted against a sealing gasket 41. The booster valve casing has a low pressure inlet port 42 leading to a restricted orifice 43, in turn leading to a relatively large low pressure chamber 44. The low pressure chamber 44 communicates with bleeder valve chamber 36 through a tube 45 disposed inside of the casing 10 of the pressure gage.

The booster valve casing 40 has a central high pressure or full system pressure inlet port 46 and a system pressure vent port 47 leading to and from the chamber 44 on one side of a shuttle piston 48 contained in the chamber 44. The exterior side of piston 48 carries a compressible disc 49 for sealing engagement with a reduced diameter boss 50 of the valve body surrounding the high pressure inlet port 46.

The low pressure inlet port 42 receives reduced system control pressure, such as 5 p.s.i., through a fitting 51, FIG. 3, from a reducing regulator 52 coupled to a supply line 53 for full system pressure, such as 60 p.s.i. The full system pressure supply line 53 delivers full or high pressure to the port 46 through a suitable fitting 54 and also delivers pressure through a branch line 55 to fuel valve 16 as shown in FIG. 3.

OPERATION

With the pneumatic pressure line 13 connected with the gage inlet fitting 12 and delivering pressure to the Bourdon tube 11 from chamber 14, the gage high pressure set point indicated by manual pointer 30 is established or dialed. The remainder of the system is connected with the booster valve casing 40, as already described.

When the pressure to the gage through fitting 12 rises beyond the established set point or safe upper limit, the pointer 27 can turn no further having come into contact with stop pin 32. However, increased pressure beyond this point will cause further expansion of Bourdon tube 11 carrying with it link 19 and moving bleeder valve actuator pin 34 against fixed abutment screw 23 on arm 24 of pointer drive mechanism, which is now locked. This will result in opening or venting of bleeder valve 33, as described.

Figure 4:
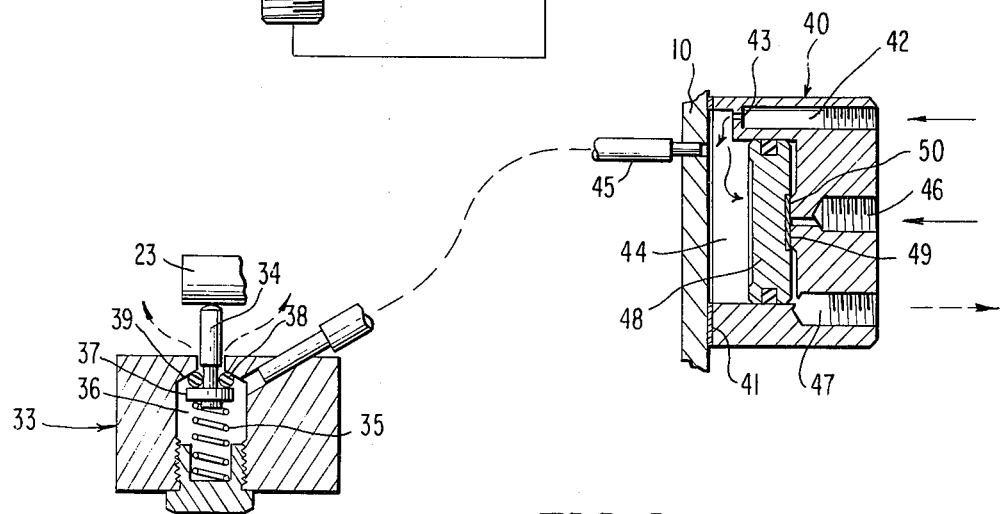
FIG. 4 is a fragmentary cross sectional view on an enlarged scale showing details of the booster and bleeder valves and their operational relationship.

When the bleeder valve vents, FIG. 4, the pressure in booster valve chamber 44 behind piston 48 is further reduced so that the full system pressure through port 46 on the opposite and much smaller diameter area of the piston will be enabled to move the piston away from the boss or seat 50 and thereby vent full system pressure through the vent port 47 of the booster valve. This venting of system pressure can, in turn, shut down the machine or engine 15 by starving it of fuel through the diaphragm fuel valve 16 which is in pressure communication through line 55 with the now-reduced system pressure in line 53 following the venting action of the booster valve.

When bleeder valve 33 is normally closed, as when the pressure indicated by the gage pointer 27 is safe, FIG. 1, the pressure in chamber 44, even though low, is sufficient when acting on the larger surface of piston 48 to seat the piston against high pressure input port 46 as shown in FIG. 4.

Thus, a single integrated, compact and relatively simple pressure gage can serve to indicate machine pressure, to establish an upper safe limit of pressure and to automatically vent system or control pressure, as described. This is done by the unique coaction of bleeder valve 33 mounted on lost motion carrier link 19 and booster valve casing 40 mounted on gage casing 10, as described.

It is to be understood that the form of the invention herewith shown and described is to be taken as a preferred example of the same and that various changes in the shape, size and arrangement of parts may be resorted to, without departing from the spirit of the invention or scope of the subjoined claims.

We claim:

1. A venting pressure gage comprising a Bourdon tube having a connection with an external pressure device requiring monitoring, a carrier link secured to the moving end of the Bourdon tube to travel therewith, a rotary gage pointer and drive mechanism including a pivoted arm, means forming a lost motion connection between said arm and carrier link, a manually adjustable gage pointer stop on said gage operable to establish an upper safe pressure limit and preventing movement of said pointer beyond said limit, a normally closed bleeder valve on said carrier link including an actuator element movable with the carrier link into engagement with an abutment element on said arm when said arm is locked due to engagement of said pointer with said stop, a booster valve casing on said gage having a low pressure chamber and a low pressure input port leading to said chamber, tube means interconnecting said low pressure chamber and said bleeder valve, a piston in said low pressure chamber, said booster valve casing having a high pressure input port and a high pressure venting port on the side of the piston remote from said bleeder valve, and the effective area of the piston nearest the bleeder valve being larger than the effective area of the piston nearest the high pressure input port, whereby opening and venting of the bleeder valve reduces pressure in the low pressure chamber sufficiently to enable moving of said piston away from the high pressure input port.

2. A venting pressure gage as defined by claim 1 in which said bleeder valve comprises a casing having a chamber provided with a seat at one end thereof, said tube means leading into said chamber of the bleeder valve, said actuator element of the bleeder valve having a shoulder in the bleeder valve chamber opposing said seat, a compressible ring seal disposed between said seat and shoulder, and an expansion spring in the bleeder valve chamber pressing on said shoulder.

3. A venting pressure gage as defined by claim 1, wherein said low pressure input port of the booster valve includes a restricted orifice between said port and said low pressure chamber of the booster valve.

4. A venting pressure gage as defined by claim 1, and said booster valve casing having a boss of reduced diameter in comparison to the diameter of said low pressure chamber surrounding the high pressure input port and forming a seat, and an opposing compressible disc on said piston adapted to engage said seat under influence of pressure in said low pressure chamber when said bleeder valve is closed.

5. A venting pressure gage as defined by claim 4, and said booster valve casing open at its end having said low pressure chamber, said open end abutting a flat wall of the pressure gage and a gasket intervened between said open end and said flat wall, said tube means coupled in said flat wall in communication with said low pressure chamber.

6. A venting pressure gage as defined by claim 1, and an external reducing pressure regulator coupled with said low pressure input port of said booster valve casing, and supply line means to conduct relatively high pressure control fluid to said regulator and said high pressure input port of the booster valve casing.

7. A venting pressure gage as defined by claim 1, wherein said venting port and low pressure input port are on opposite sides of the booster valve casing and said high pressure input port is between the venting and low pressure input ports and centrally located relative to said piston.

8. A venting pressure gage as defined by claim 7, and said piston being a free shuttling piston within the low pressure chamber of the booster valve casing.

* * * * *